United States Patent [19]

Kawasaki et al.

[11] Patent Number: 5,190,044
[45] Date of Patent: Mar. 2, 1993

[54] ULTRASONIC BLOOD FLOW IMAGING APPARATUS

[75] Inventors: Schuichi Kawasaki; Toshio Shiraska, both of Tochigi; Takanobu Uchibori, Ootawara; Yasuo Miyajima, Utsunomiya, all of Japan

[73] Assignee: Kabushiki Kaisha Toshiba, Kawasaki, Japan

[21] Appl. No.: 677,092

[22] Filed: Mar. 29, 1991

[30] Foreign Application Priority Data

Mar. 30, 1990 [JP] Japan .................. 2-83907

[51] Int. Cl.⁵ .............................. A61B 8/12
[52] U.S. Cl. .................. 128/661.09; 128/660.05; 128/661.08
[58] Field of Search ........ 128/660.05, 661.07, 128/661.08, 661.09, 661.10; 73/861.25

[56] References Cited

U.S. PATENT DOCUMENTS

| 4,966,151 | 10/1990 | Takeuchi | 128/660.05 |
| 4,991,589 | 2/1991 | Hongo et al. | 128/661.09 |
| 4,993,417 | 2/1991 | Seo | 128/661.09 |
| 5,058,593 | 10/1991 | Forestieri et al. | 128/661.09 |
| 5,078,146 | 1/1992 | Sato | 128/661.09 |

Primary Examiner—William E. Kamm
Assistant Examiner—George Manuel
Attorney, Agent, or Firm—Finnegan, Henderson, Farabow, Garrett and Dunner

[57] ABSTRACT

An ultrasonic blood flow imaging apparatus of this invention includes an ultrasonic probe, a transmission system, a reception system, a B mode processing system, a CFM processing system, an FFT processing system, a video system, and a control system. The CFM processing system includes a new discriminating means. The discriminating means receives power, average blood flow velocity, and variance data output from an auto-correlation circuit. The discriminating means can discriminate Doppler shift signals (blood flow signals), noise signals, and clutter signals from each other with high precision on the basis of a relationship in combination of two or more received factors, i.e., the power, average blood flow velocity, and variance data. With such discrimination processing, only necessary blood flow signals can be extracted, and hence high-precision blood flow information can be obtained.

18 Claims, 11 Drawing Sheets

| DIAGNOSIS TARGET | INITIAL FIXED THRESHOLD VALUE | REDUCTIONAL GRADIENT COEFFICIENT (dB/cm/MHz) |
|---|---|---|
| CIRCULATORY ORGAN | A1 | k1 |
| ABDOMINAL PORTION | A2 | k2 |
| PERIPHERAL VASCULAR | A3 | k3 |

FIG. 8

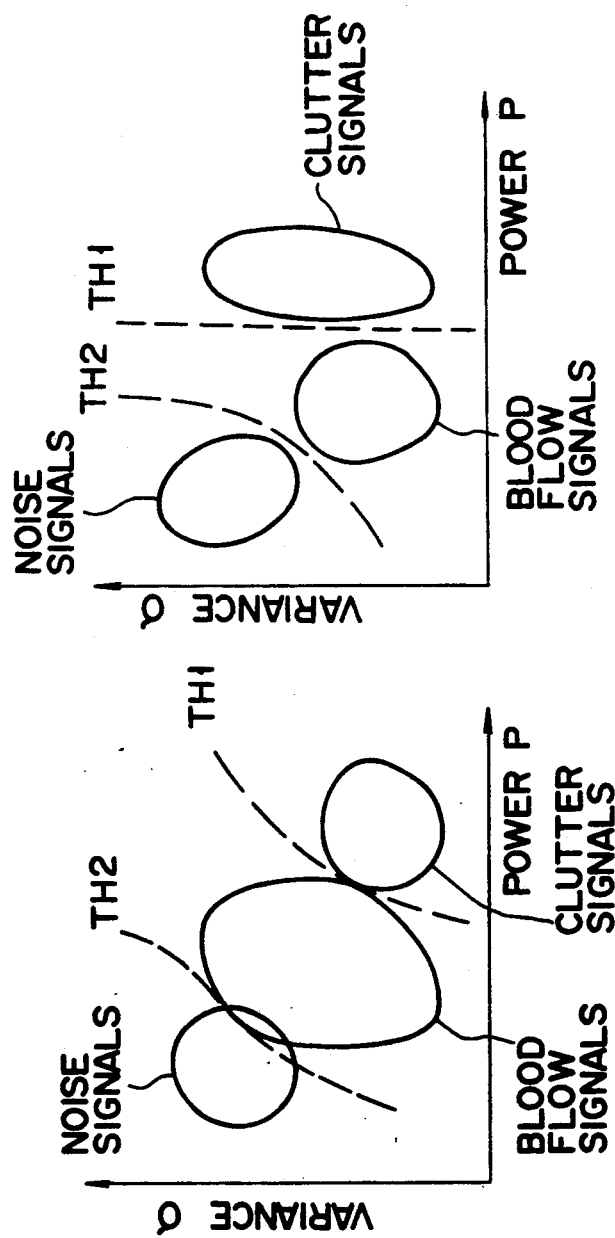

ULTRASONIC BLOOD FLOW IMAGING APPARATUS

BACKGROUND OF THE INVENTION

1. Field of the Invention

The present invention relates to an ultrasonic blood flow imaging apparatus for obtaining blood flow information inside an object to be examined (living body) by using an ultrasonic Doppler effect, and displaying the blood flow information as a two-dimensional image.

2. Description of the Related Art

An ultrasonic blood flow imaging apparatus of this type is capable of performing both an ultrasonic Doppler method and a pulse reflection method. Such an apparatus can obtain both blood flow information and tomographic image (B mode image) information by using one ultrasonic probe. In addition, the apparatus can superpose color-processed blood flow information on a tomographic image and display the resultant image in real time. The principle of measurement of a blood flow velocity as one of the pieces of blood flow information in such an apparatus will be described below.

When an ultrasonic pulse (beam) is transmitted from the ultrasonic probe to a blood flow in an object to be examined, a center frequency fo in the transmission of this ultrasonic beam is dispersed by flowing blood cells. The dispersed center frequency fo is subjected to Doppler shift to change by a frequency fd. Therefore, a center frequency f in the reception of ultrasonic echoes received by the ultrasonic probe at this time is given by f=fo+fd. In this case, the center frequency in the transmission of the ultrasonic beam and the Doppler shift frequency fd are represented by the following equation:

$$fd = \frac{2v\cos\theta}{c} \cdot fo$$

where
- v: blood flow velocity
- θ: angle defined by ultrasonic beam and blood vessel
- c: velocity of sound.

By detecting the Doppler shift frequency fd, therefore, the blood flow velocity v can be measured. The blood flow velocity v obtained in this manner is displayed as a two-dimensional image as follows. As shown in FIG. 1, ultrasonic pulses are sequentially transmitted from an ultrasonic probe 1 to an object in directions a, b, c, . . . (sector scanning). It is apparent that a scan scheme to be employed is not limited to sector scanning, but other scan schemes such as linear scanning may be employed.

When ultrasonic pulses are transmitted in the direction a a plurality of times at first, these ultrasonic pulses are Doppler-shifted by a blood flow in the object. Subsequently, ultrasonic echoes are received by the same ultrasonic probe 1. The received echoes are converted into an electrical signal, and the electrical signal is transmitted to a reception circuit 2, as shown in FIG. 2. An output from the reception circuit 2 is supplied to a phase detector circuit 3, in which a Doppler shift signal is detected. Note that in the apparatus shown in FIG. 2, the illustration of a transmission system is omitted.

The detected Doppler shift signal is sampled at each of predetermined sample points in the transmission/reception direction of ultrasonic pulses, e.g., 256 sample points SP. A Doppler shift signal sampled at each sample point is filtered by an MTI (moving target indicator) filter arranged in the phase detector circuit 3. As a result, some of the slow clutter signals are removed. Each Doppler shift signal from which some of the clutter signals are removed is frequency-analyzed by a frequency analyzer 4. Blood flow information is obtained by the analysis and is supplied to a digital scan converter (DSC) 5. The information is subjected to scan conversion in the DSC 5 and is sent to a monitor 6.

On the monitor 6, a blood flow image in the direction a is displayed in real time as a two-dimensional image. Subsequently, the same operation is repeated in the directions b, c, . . . , thus displaying blood flow images (blood flow velocity distribution images) corresponding to the respective scan directions. It should be noted that each Doppler shift signal obtained by the phase detector circuit 3 contains unnecessary noise signals, and each Doppler shift signal consists of a Doppler shift signal component (blood flow signal) based on a blood flow, and a Doppler shift signal component (clutter signal) reflected from the wall of a movable organ such as a heart. The MTI filter is an effective means for removing clutter signals.

If blood flow information contains clutter signals in addition to blood flow signals, displayed blood flow information has poor precision. Therefore, high-precision diagnosis cannot be performed. In order to minimize such clutter signals, the MTI filter is used. Another conventional means for solving such a problem is based on the fact that noise signals have small power. According to this means, blood flow information having small power itself is not displayed.

In the above-mentioned means, however, since all pieces of blood flow information having small powers are not displayed, blood flow information based on blood flow signals having small power are lost. For this reason, a portion of an image from which such blood flow information is lost is sometimes displayed in brack.

In addition, blood flow signals and clutter signals are non discriminated in the conventional art. For this reason, when, for example, the ultrasonic probe is moved, or the object breathes, or a portion near the heart is set as an imaging target, clutter signals generated due to the influences of such movement are also displayed as blood flow information. Therefore, blood flow information based on only blood flow signals cannot be properly observed. This adversely affects a diagnosis.

SUMMARY OF THE INVENTION

It is an object of the present invention to provide an ultrasonic blood flow imaging apparatus which can display blood flow information representing the maximum amount of blood flow signals while minimizing clutter signals.

In order to achieve the above object, according to the present invention, there is provided an ultrasonic blood flow imaging apparatus comprising:

first means for displaying a tomographic image of an object to be examined on the basis of reflected components of ultrasonic waves transmitted to the object; and second means for color-displaying blood flow Doppler signals as a two-dimensional blood flow image upon superposition on the tomographic image, wherein the second means includes discriminating means for discriminating and separating the blood flow Doppler signals into blood flow Doppler signals having power information values lower than a predetermined value and signals other than the blood flow Doppler signals on the basis of comparison between a power information value of each blood flow Doppler signal obtained from the object and the predetermined value, and display means for displaying the blood flow Doppler signals discriminated by the discriminating means as a two-dimensional blood flow image together with the tomographic image.

In addition, in order to achieve the above object, there is provided an ultrasonic blood flow imaging apparatus comprising:

first means for displaying a tomographic image of an object to be examined on the basis of reflected components of ultrasonic waves transmitted to the object; and second means for color-displaying blood flow Doppler signals as a two-dimensional blood flow image upon superposition on the tomographic image, wherein the second means includes discriminating means for discriminating and separating the blood flow Doppler signals into blood flow Doppler signals and other signals on the basis of comparison between a variance information value of each blood flow Doppler signal obtained from the object and a predetermined value, and display mean for displaying the blood flow Doppler signals discriminated by the discriminating means as a two-dimensional blood flow image together with the tomographic image.

Furthermore, in order to achieve the above object, according to the present invention, there is provided an ultrasonic blood flow imaging apparatus comprising first means for displaying a tomographic image of an object to be examined on the basis of reflected components of ultrasonic waves transmitted to the object; and second means for color-displaying blood flow Doppler signals as a two-dimensional blood flow image upon superposition on the tomographic image, wherein the second means includes discriminating means for discriminating and separating the blood flow Doppler signals into blood flow Doppler signals and other signals on the basis of comparison between a power information value of each blood flow Doppler signal obtained from the object and a first predetermined value, and comparison between a variance information value of each blood flow Doppler signal and a second predetermined value, and display means for displaying the blood flow Doppler signals discriminated by the discriminating means as a two-dimensional blood flow image together with the tomographic image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a view showing a combination of fixed threshold values and coefficients with the threshold values changing in accordance with objects to be examined;

FIG. 17 is a graph showing a relationship between the distributions of blood flow signals, clutter signals, and noise signals, the power p, and the variance $\sigma$ in a case wherein an object to be examined is a heart; and FIG. 18 is a graph showing a relationship between the distributions of blood flow signals, clutter signals, and noise signals, the power p, and the variance $\sigma$ in a case wherein an object to be examined is cartoid arteries.

DETAILED DESCRIPTION OF THE PREFERRED EMBODIMENTS

The first embodiment of the present invention will be described below.

Figure 3:
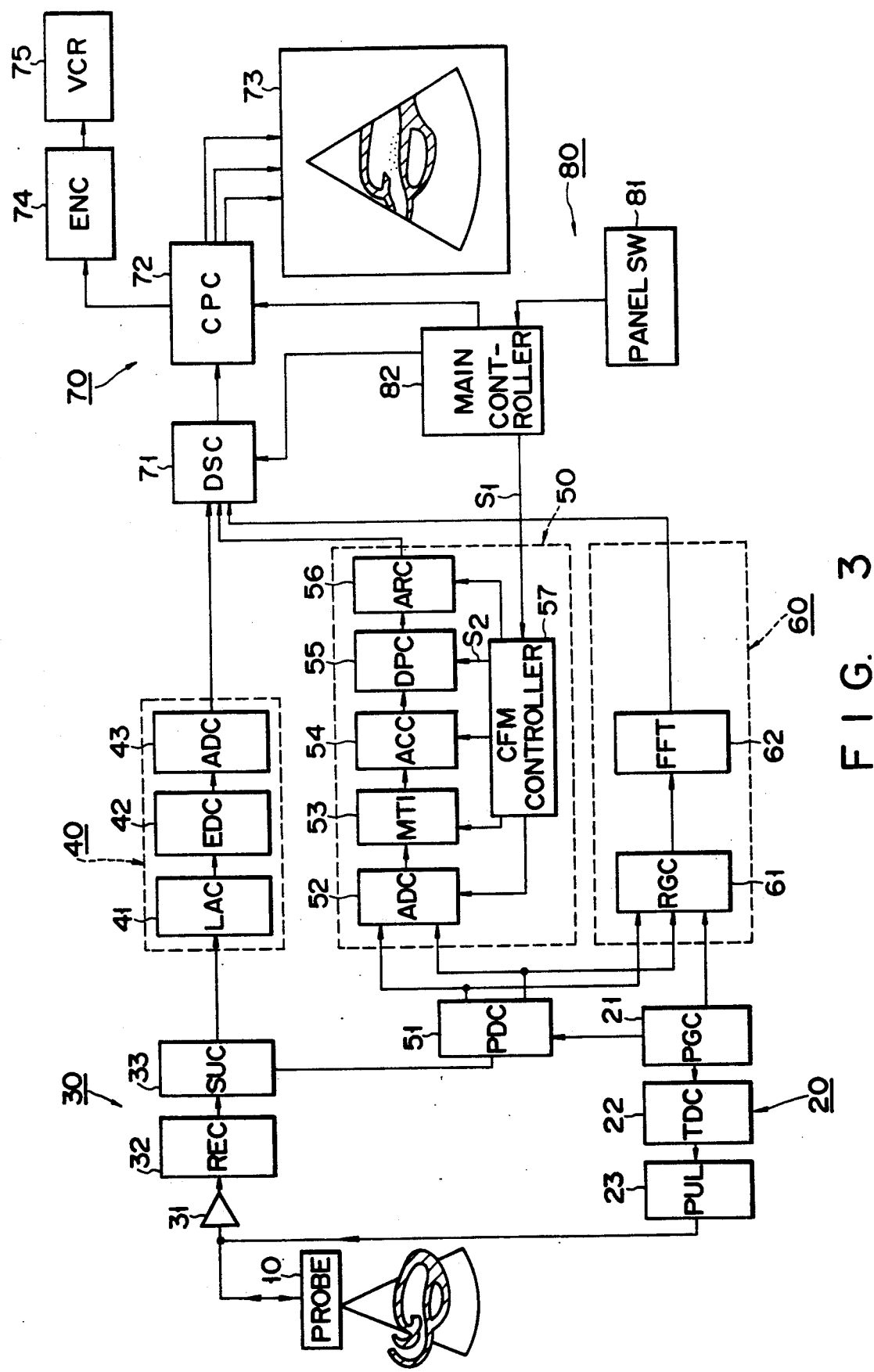
FIG. 3 is a block diagram showing an apparatus according to the first embodiment of the present invention.

As shown in FIG. 3, an ultrasonic blood flow imaging apparatus of this embodiment comprises an ultrasonic probe 10, a transmission system 20, a reception system 30, an M mode processing system 40, a CFM processing system 50, an FFT processing system 60, a video processing system 70, and a control system 80.

The ultrasonic probe (PROBE) 10 has an array of ultrasonic transducers. The ultrasonic probe (PROBE) 10 causes each of these ultrasonic transducers to transmit and receive an ultrasonic pulse to and from an object to be examined.

The transmission system 20 includes a pulse generator (PGC) 21, a transmission delay circuit (TDC) 22, and a pulser (PUL) 23 and serves to supply a signal to the ultrasonic probe 10 so as to cause it to transmit an ultrasonic pulse.

In this case, the pulse generator 21 supplies N rate pulses to the transmission delay circuit 22 to obtain one ultrasonic raster in one direction of a color flow mapping (CFM) image (also called a color Doppler image) as blood flow information. The transmission delay circuit 22 sets a predetermined delay time for each rate pulse received from the pulse generator 21 in units of ultrasonic transducers. With this operation, an ultrasonic beam can be deflected and transmitted in a predetermined direction and can be focused in this deflection and transmission. The delayed rate pulses are supplied to the pulser 23. The pulser 23 repeatedly drives each ultrasonic transducer by a predetermined number of times in accordance with a corresponding delayed rate pulse to transmit ultrasonic pulses.

Figure 1:
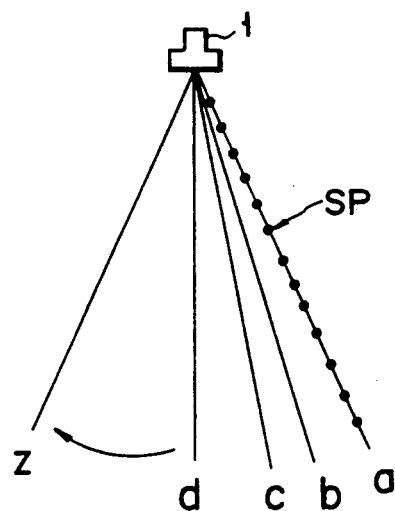
FIG. 1 is a view showing a conventional ultrasonic scan scheme (sector scan scheme) in measurement for blood flow information.
Figure 2:
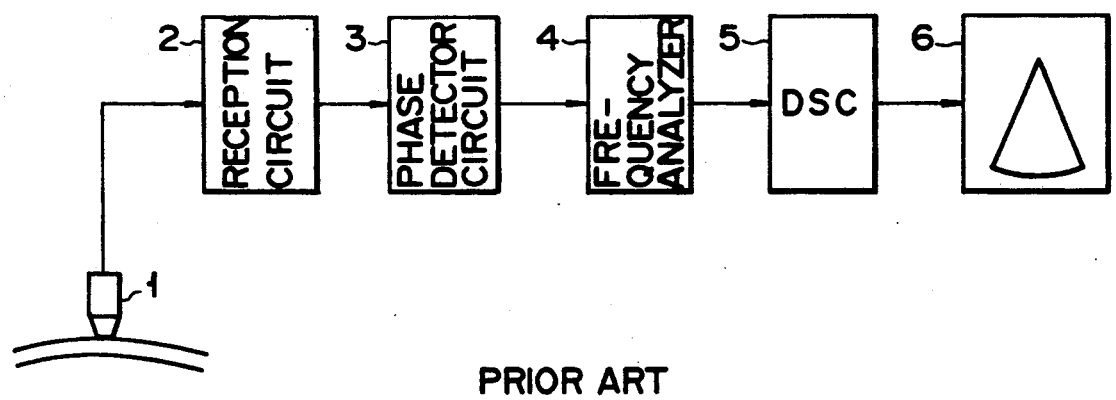
FIG. 2 is a block diagram showing a conventional ultrasonic blood flow imaging apparatus.

When the ultrasonic probe 10 is driven by the pulser 23, ultrasonic pulses are transmitted from the probe 10 to an object to be examined (not shown). The ultrasonic pulses transmitted into the object are subjected to Doppler shift due to blood flowing in a blood vessel in the object. As a result, ultrasonic echoes contain Doppler shift signals. The ultrasonic echoes containing the Doppler shift signals are received by the same ultrasonic transducers as those in the transmission. Therefore, a plurality of reception signals are obtained in units of, e.g., ultrasonic rasters shown in FIG. 1 by the ultrasonic probe 10.

The reception system 30 includes a preamplifier 31, a reception delay circuit (RDC) 32, and a summation circuit (SUC) 33. The reception signals obtained by the ultrasonic probe 10 are supplied to the preamplifier 31 to be amplified. The amplified reception signals are supplied to the reception delay circuit (RDC) 32. The reception delay circuit 32 sets a delay time for the reception signal from each ultrasonic transducer to cancel out the delay time which has been set in the transmission period. The summation circuit 33 adds the reception signals from the respective ultrasonic transducers in units of rate pulses.

The B mode processing system 40 comprises a logarithmic amplifier circuit (LAC) 41, an envelope detector circuit (EDC) 42, and an analog/digital converter (ADC) 43. The B mode processing system 40 receives only an addition signal of the first rate of addition signals of a plurality of rates which are supplied from the summation circuit 33. The received addition signal is then supplied to the logarithmic amplifier circuit 41 to be logarithmically amplified. This logarithmically amplified signal is envelope-detected by the envelope detector circuit 42. The envelope detector circuit 42 envelope-detects the addition signal to obtain a vide signal for generating a B mode image (tomographic image) in units of ultrasonic rasters. This signal is then converted into a digital signal by the A/D converter (ADC) 43 and is supplied to a DSC 71.

The CFM processing system 50 comprises a phase detector circuit 51, an ADC 52, an MTI filter 53, an auto-correlation circuit 54, a discrimination processing circuit 55, an arithmetic circuit 56, and a CFM controller 57 for controlling these circuits. The CFM processing system 50 serves to obtain a CFM image a blood flow information by using an auto-correlation method, and constitutes a major characteristic feature of the present invention.

The phase detector circuit 51 receives addition signals from the summation circuit 33 in units of rates. The phase detector circuit 51 performs orthogonal phase detection of each addition signal as a reception signal and removes high-frequency components from the addition signal by using a low-pass filter (LPF) (not shown), thus outputting a Doppler shift signal fd, i.e., a Doppler detection output for generating a blood flow image. This Doppler detection output contains unnecessary signals, such as signals (clutter signals) reflected from a slow object, e.g., the wall of heart, and noise signals, in addition to necessary blood flow signals.

The Doppler detection output from the phase detector circuit 51 is supplied to the CFM processing system 50 and the FFT processing system 60.

The FFT processing system 60 comprises a range gate circuit (RGC) 61 for determining a sample point at which fast Fourier transform is to be performed, and a fast Fourier transformer (FFT) 62. The FFT processing system 60 serves as a blood flowmeter for indicating a change in blood flow velocity over time at one sample point determined by the range gate circuit (RGC) 61.

The video system 70 comprises the DSC 71 for scan-converting an ultrasonic scan image into a TV scan image, a color processing circuit (CPC) 72 for performing color processing for an output image from the DSC 71, and a monitor 73 for displaying a color-processed image.

The control system 80 is constituted by a panel SW 81 and a main controller 82. In response to an operation command from the panel SW 81, the main controller 82 supplies a control signal $S_1$ for controlling each circuit in the CFM processing system 50 to the CFM controller 57 in the CFM processing system 50.

The CFM control system 50 will be described in detail below. The ADC 52 converts a Doppler detection output into a digital signal, and supplies the conversion output to the MTI filter 53. The MTI filter 53 detects the movement of a blood flow in accordance with phase changes of the same pixel between N rate pulses, and can remove some clutter signals. The Doppler detection output from which some clutter signals are removed is supplied to the auto-correlation circuit (ACC) 54 to be frequency-analyzed. The auto-correlation circuit 54 is a type of frequency analyzer and is capable of performing frequency analysis at a plurality of points in real time.

The discrimination processing circuit (DPC) 55 is arranged between the auto-correlation circuit 54 and the arithmetic circuit 56. The discrimination processing circuit (DPC) 55 compares each pixel value of a Doppler detection output consisting of blood flow signals, residual clutter signals, and noise signals with a predetermined threshold value by a method to be described later, and performs blanking of pixel values of the Doppler detection output which exceed the predetermined threshold value.

Figure 4:
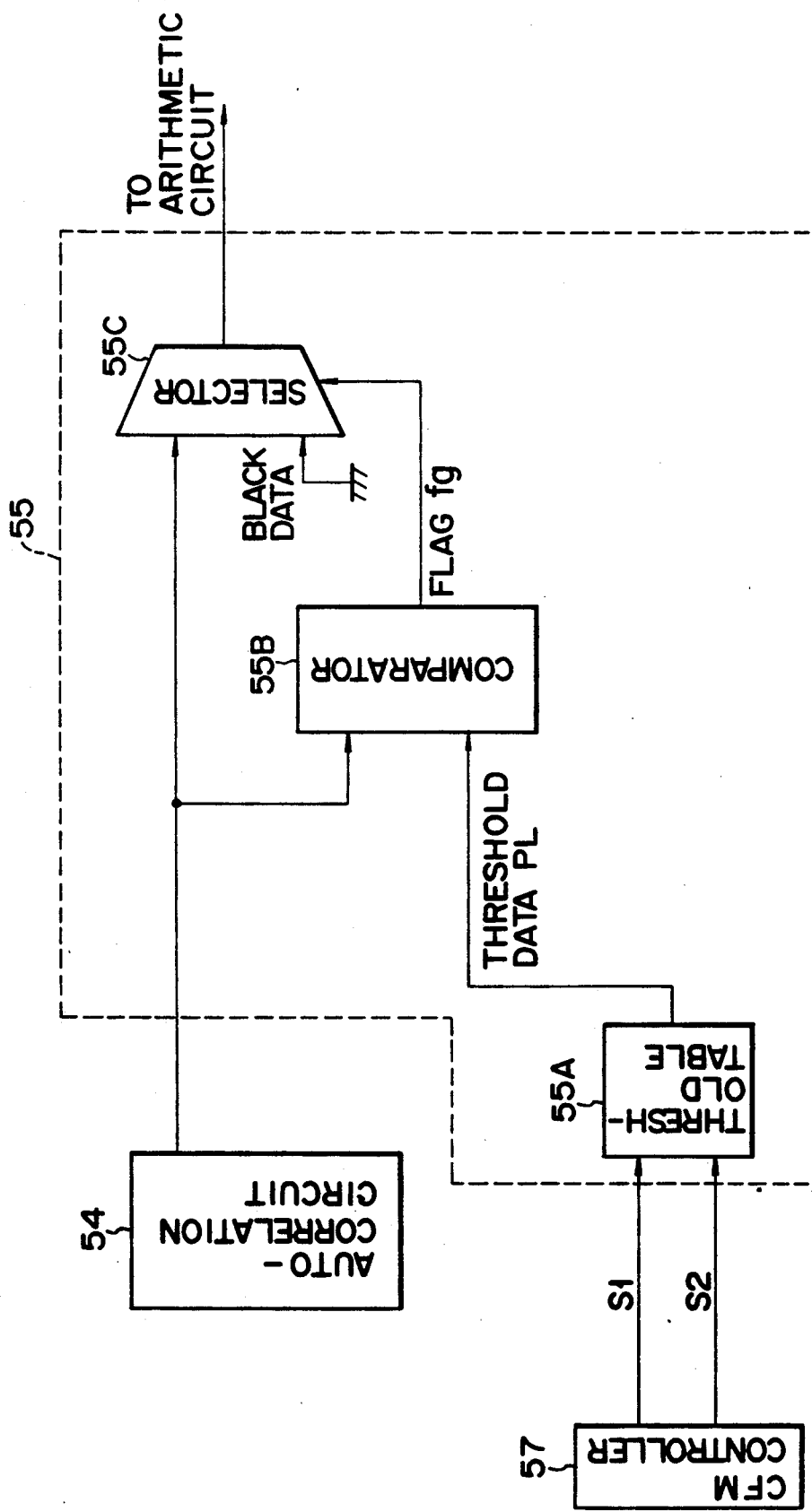
FIG. 4 is a block diagram showing a detailed arrangement of a discrimination processing circuit in FIG. 3.
Figure 5:
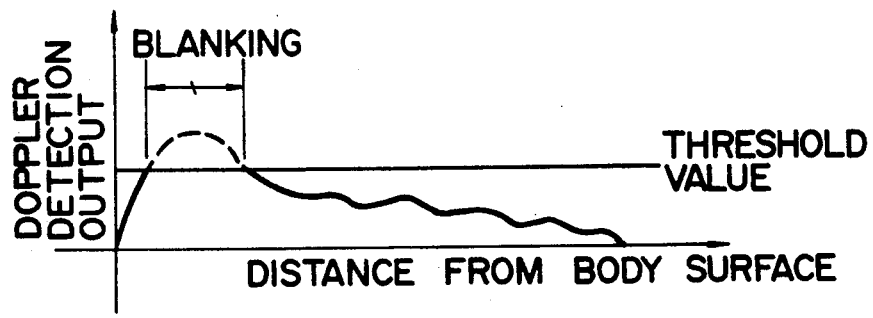
FIG. 5 is a graph for showing an operation of the discrimination processing circuit.
Figure 6:
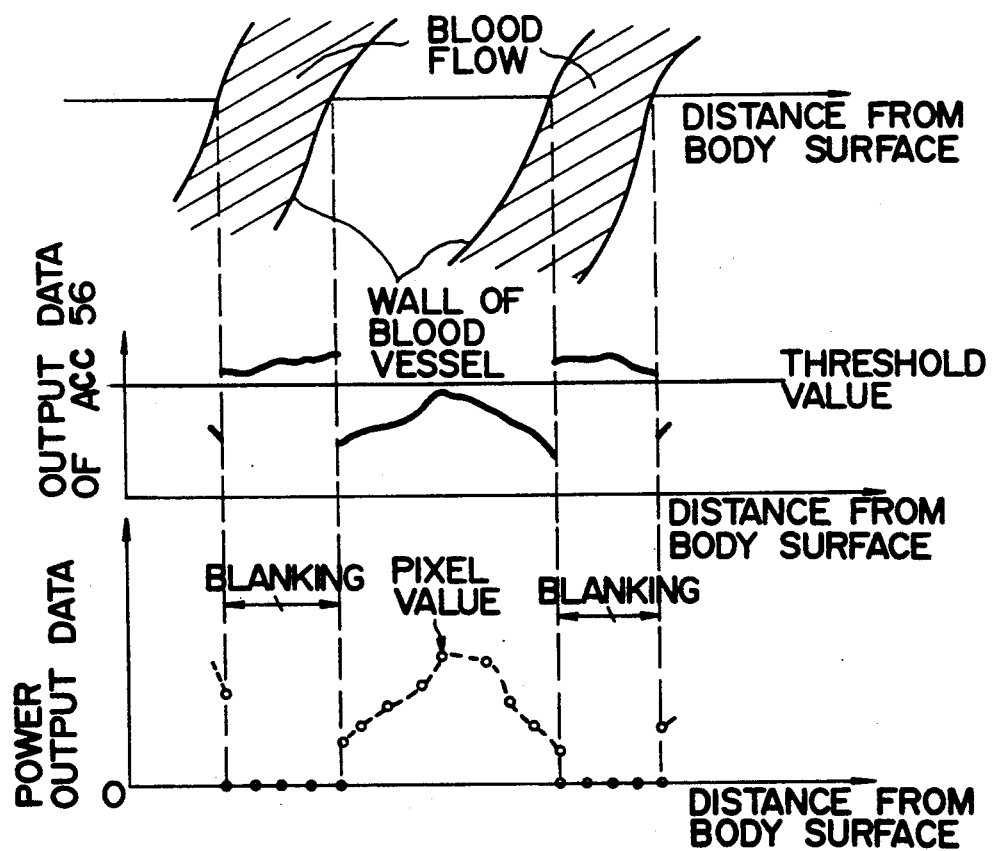
FIG. 6 is a graph representing a case wherein no change in threshold value occurs in accordance with a distance from a body surface.

FIG. 4 is a block diagram showing a detailed arrangement of the discrimination processing circuit 55. The above-mentioned blanking will be described in detail below with reference to FIG. 4. Blanking of power p will be described as an example. It is apparent that blanking can be performed with respect to an average velocity v and a variance σ. The discrimination processing circuit 55 comprises a threshold table 55A, a comparator 55B, and a selector 55C. The threshold table 55A receives distance information S1 based on a distance from a body surface, and diagnosis target information S2 from the CFM controller 57. In accordance with these pieces of information, the threshold table 55A supplies threshold data to the comparator 55B. The comparator 55B compares a predetermined threshold value with power input data as a Doppler detection output supplied from the auto-correlation circuit 54. FIGS. 5 and 6 show this state. During a period in which the power input data exceeds the threshold value, a flag fg is kept supplied to the selector 55. During the period in which this flag fg is kept supplied, the power input data is blanked, i.e., set to be zero, thus obtaining power output data as a Doppler detection output containing no noise or clutter signals. This data is supplied to the arithmetic circuit 56.

The arithmetic circuit 56 obtains the blood flow average velocity v, the variance σ, and the power p as blood flow information in accordance with the signal supplied from the discrimination processing circuit 55. Subsequently, the average velocity v, the variance σ, and the power p as blood flow information are written in the DSC 71.

Meanwhile, the range gate 61 performs a range-gating operation of the Doppler detection output supplied from the phase detector circuit 51 so as to set one sample point on one ultrasonic raster. With this operation, only Doppler detection output components of the doppler detection output at the sample point are extracted. The FFT 62 performs frequency analysis of the Doppler detection output from the range gate circuit 61 to obtain a change in blood flow velocity over time. The blood flow velocity information obtained by this operation is written in the DSC 71.

Figure 7:
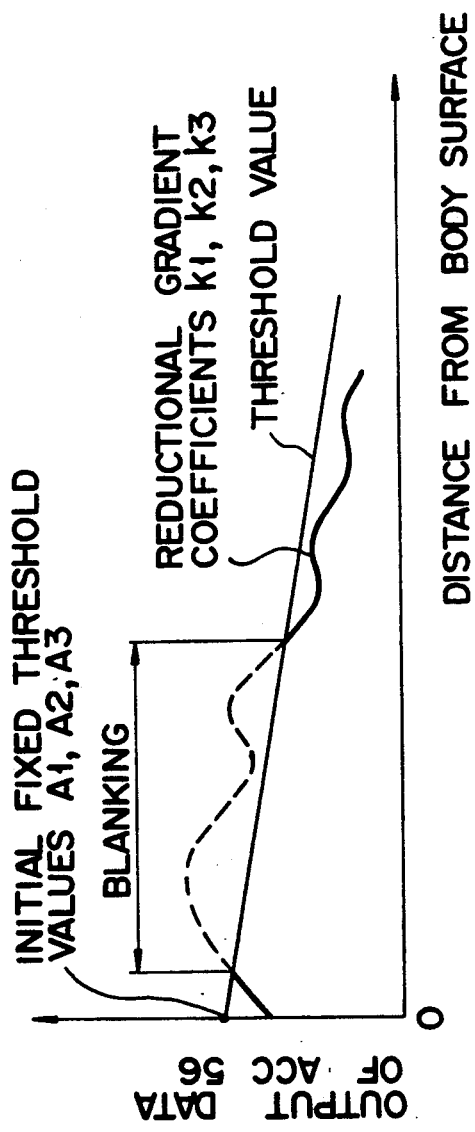
FIG. 7 is a graph representing a case wherein a change in threshold value occurs in accordance with a distance from the body surface.

With the operation described above, the following data are written in the DSC 71: the data for generating an M mode image; the data for generating a CFM image; and the data for generating blood flow velocity information. These data are read out from the DSC 71 and are subjected to color processing in the color processing circuit 72. When, for example, average velocity-variance (v−σ) display is to be performed, the color processing circuit 72 converts a flow of blood approaching the ultrasonic probe 10 into a red image, and converts a flow of blood separating from the probe 10 into a blue image. In addition, the average velocity v is represented as a difference in brightness by the color processing circuit 72, while the variance σ is represented by hue. The blood flow information is recorded in a VCR (video cassette recorder) 75 through an encoder 74, as needed. In the above description, it is assumed that fixed threshold values are respectively set for the average velocity v, the variance σ, and the power p. That is, no consideration is given to the influences of ultrasonic attenuation by a living body. As shown in FIG. 7, however, threshold values may be set in accordance with the distance from the body surface. FIG. 7 shows a case wherein the threshold value is decreased with an increase in distance from the body surface. With this threshold value, blanking can be performed in consideration of the influences of ultrasonic attenuation by the living body.

In addition, as shown in FIG. 7 and 8, fixed threshold values can be set in accordance with diagnosis targets. Furthermore, deep directional fixed reduction coefficients corresponding to the diagnosis targets may be provided to the fixed threshold values corresponding to the diagnosis targets so that the threshold values can be changed in accordance with combinations of the diagnosis targets and the distances from the body surface. Referring to FIG. 8, as the diagnosis targets, a circulatory organ, an abdominal portion, and a peripheral vascular portion are exemplified, and with initial fixed threshold values A1, A2, A3, reductional gradient coefficients k1, k2, and k3 being assigned thereto, respectively. In this case, the values A1, A2, A3 are corrected by the values k1, k2, k3 with the distance from the body surface and the diagnosis targets, respectively. The threshold values in FIGS. 7 and 8 respectively represent a threshold value for threshold value discrimination processing of the average velocity v, a threshold value for threshold value discrimination processing of the variance σ, and a threshold value for threshold value discrimination processing of the power p. According to the scheme shown in FIGS. 7 and 8, therefore, blood signals and clutter signals can be discriminated from each other with high precision in accordance with a diagnosis position and a diagnosis target, thus realizing high-precision blood flow imaging.

According to this embodiment, with the above-described threshold value discrimination processing, pixels are blanked during a period in which corresponding pixel values exceed a threshold value so that no color noise appears on the entire screen even if clutter signals and blood flow signals have similar frequencies, unlike the conventional apparatus in which the MTI filter 53 cannot satisfactorily remove only the clutter signals in such a case. That is, in this embodiment, a CFM image is substantially constituted by only blood flow signals.

When the ultrasonic probe 10 is moved along a body surface, unnecessary color noise, which tends to be generated upon movement of the probe 10, can be prevented by decreasing a corresponding threshold value. In the above-described embodiment, even if, for example, blood vessels in limbs are scanned while the ultrasonic probe 10 is moved, there is no possibility that an operator loses a blood vessel because the entire display screen of the monitor is colored.

Note that a threshold value is selected with ultrasonic attenuation in a living body, a sensitivity distribution based on a transmission/reception wave field, a diagnosis target, and the like being set as parameters.

In the case described above, pixels subjected to blanking are converted into black data. However, the present invention is not limited to this, but such pixels may have a display format different from that of a blood flow displayed on the monitor 73. For example, color coating which is not used for a blood flow may be used, or pixels may be displayed with brightness lower than that of a blood flow. In addition, blood flow signals, clutter signals, and noise signals may be respectively displayed in different formats.

An apparatus according to the second embodiment of the present invention will be described next.

Figure 9:
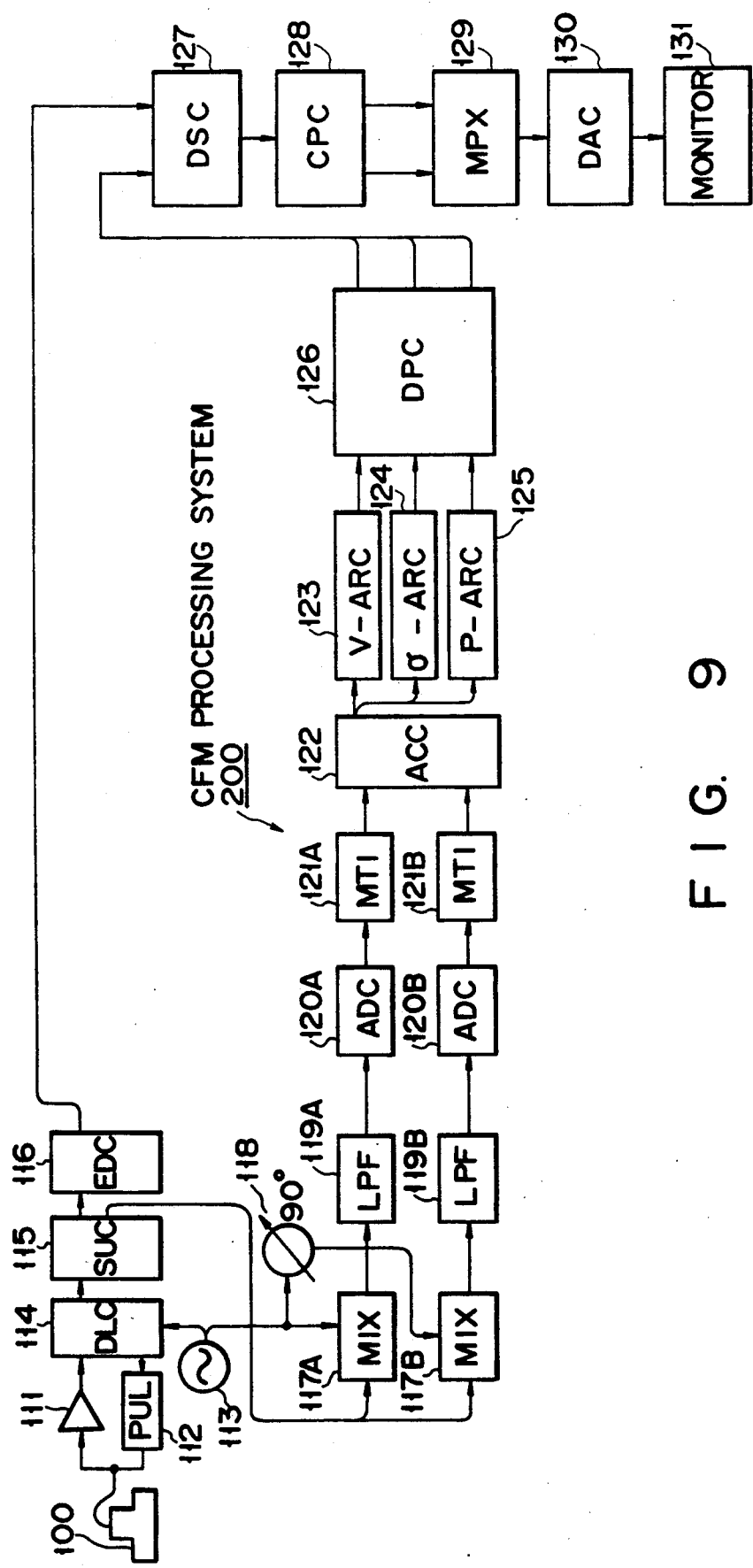
FIG. 9 is a block diagram showing an apparatus according to the second embodiment of the present invention.

FIG. 9 is a block diagram showing an ultrasonic blood flow imaging apparatus according to another embodiment of the present invention. As shown in FIG.

9, the apparatus of this embodiment comprises an ultrasonic probe 100, a preamplifier 111, a pulser (PUL) 112, an oscillator 113, a delay circuit (DLC) 114, a summation circuit (SUC) 115, an envelope detector circuit (EDC) 116, mixers (MIXs) 117A and 117B, a 90° phase shift circuit 118, low-pass filters (LPFs) 119A and 119B, analog/digital converters (ADCs) 120A and 120B, MTI filters 121A and 121B, an auto-correlation circuit (ACC) 122, an average velocity v-arithmetic circuit 123, a variance $\sigma$-arithmetic circuit 124, a power p-arithmetic circuit 125, a discrimination processing circuit (DPC) 126, a DSC 127, a color processing circuit (CPC) 128, a multiplexer (MPX) 129, a D/A converter (DAC) 130, and a monitor 131. In this case, a CFM processing system 200 is constituted by the mixers (MIXs) 117A and 117B, the 90° phase shift circuit 118, the low-pass filters (LPFs) 119A and 119B, the A/D converters (ADCs) 120A and 120B, the MTI filters 121A and 121B, the auto-correlation circuit (ACC) 122, the average v-arithmetic circuit 123, the variance $\sigma$-arithmetic circuit 124, the power p-arithmetic circuit 125, and the discrimination processing circuit (DPC) 126.

One of signals output from the summation circuit 115 is supplied to the DSC 127 through the envelope detector circuit 116, while the other signal is sent to the CFM processing system. A signal supplied to the summation signal 115 is divided into two signals. The two signals are respectively supplied to the mixers 117A and 117B. Reference signals $f_0$ from the oscillator 113 are respectively supplied to the mixers 117A and 117B with a phase difference of 90° through the 90° phase shifter circuit 118. As a result, a Doppler shift signal fd and a (2$f_0$/fd) signal are respectively input to the low-pass filters 119A and 119B, so that high-frequency components are removed by the low pass filters 119A and 119B, and only the Doppler shift signals fd are obtained. These signals become Doppler detection outputs for an arithmetic operation of blood flow information. Note that the Doppler shift signals fd contain blood flow signals, clutter signals, and noise signals. The Doppler detection outputs obtained by the low-pass filters 119A and 119B are respectively supplied to the MTI filters 121A and 121B. The maximum amount of blood signals are obtained from the Doppler shift signals fd by the MTI filters 121A and 121B. The autocorrelation circuit 122 is a frequency analyzer. The circuit 122 receives outputs from the MTI filters 121A and 121B, and performs frequency analysis at a plurality of points of the received signals in real time. The average velocity v-arithmetic circuit 123 calculates the average velocity v. The variance $\sigma$-arithmetic circuit 124 calculates the $\sigma$. The power p-arithmetic circuit 125 calculates the power p.

The average velocity v, the variance $\sigma$, and the power p are supplied to the discrimination processing circuit 126 to perform discrimination between blood signals, noise signals, and clutter signals. Pixels determined to be noise signals and clutter signals are subjected to blanking, and only pixels determined to be blood signals are output.

Figure 10:
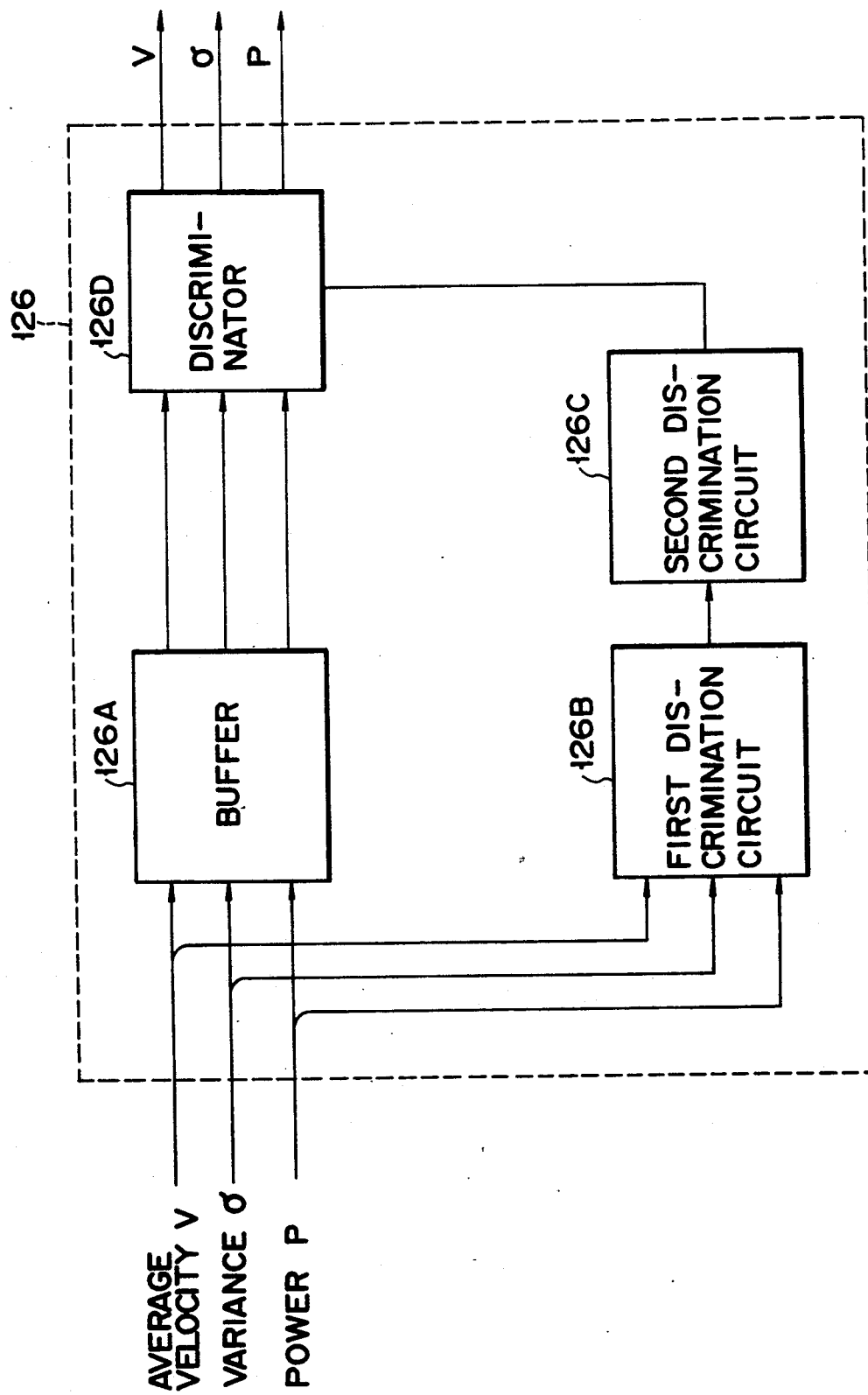
FIG. 10 is a block diagram showing a detailed arrangement of a discrimination processing circuit in FIG. 9.

The discrimination processing circuit 126, which constitutes the major characteristic feature of this embodiment, will be described in detail below with reference to FIG. 10. The discrimination processing circuit 126 comprises a buffer 126A, a first discrimination circuit 126B, a second discrimination circuit 126C, and a discriminator 126D.

Assume that the average velocity, variance, and power of an ith pixel $D_i$ to be operated are respectively represented by $V_i$, $T_i$, and $P_i$. In this case, the first discrimination circuit 126A makes the following determination:

If $f_1(V_i, T_i, P_i) > TH_1$, $D_i$ is determined to be a (clutter signal, and $Z_i = 1$ is set.

If $f_2(V_i, T_i, P_i) < TH_2$, $D_i$ is determined to be a noise signal, and $Z_i = 2$ is set.

Figure 11:
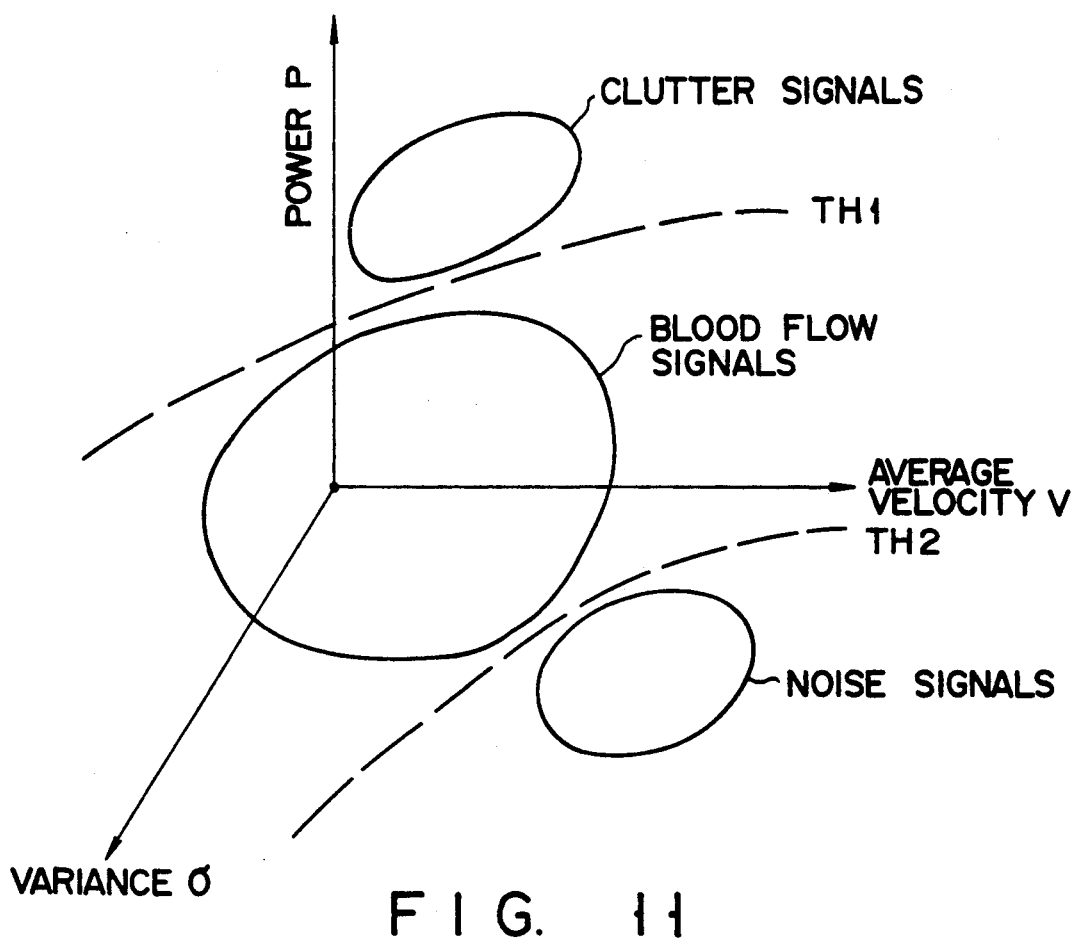
FIG. 11 is a graph showing a relationship between the distributions of blood flow signals, clutter signals, and noise signals, a variance $\sigma$, and the frequency of occurrence of the variance $\sigma$.

Otherwise, $D_i$ is determined to be a blood flow signal, and $Z_i = 3$ is set (see FIG. 11).

Figure 12:
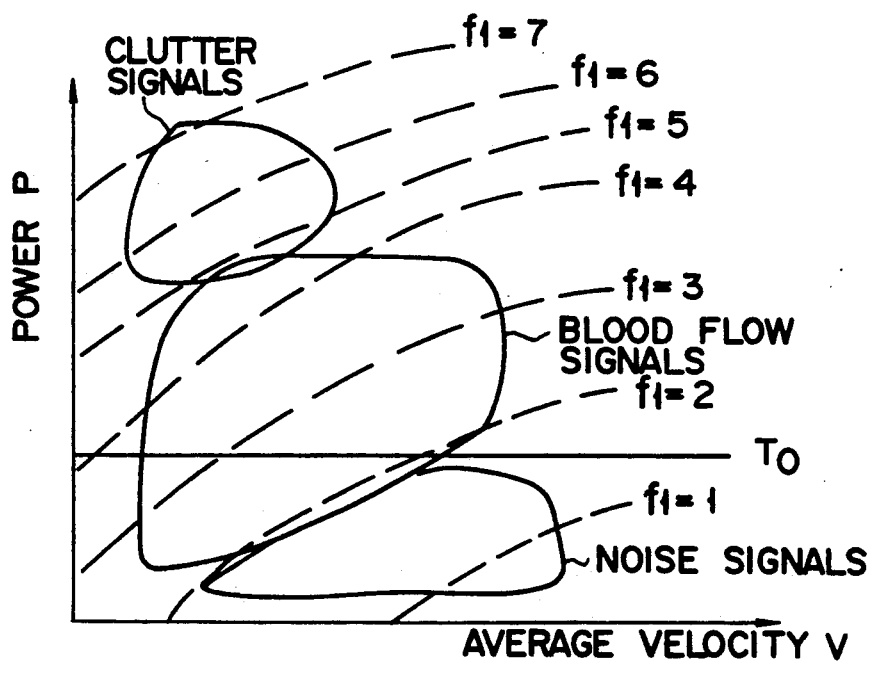
FIG. 12 is a graph showing a relationship between the distributions of blood flow signals, clutter signals, and noise signals, an average velocity v, power p, and a threshold function.
Figure 13:
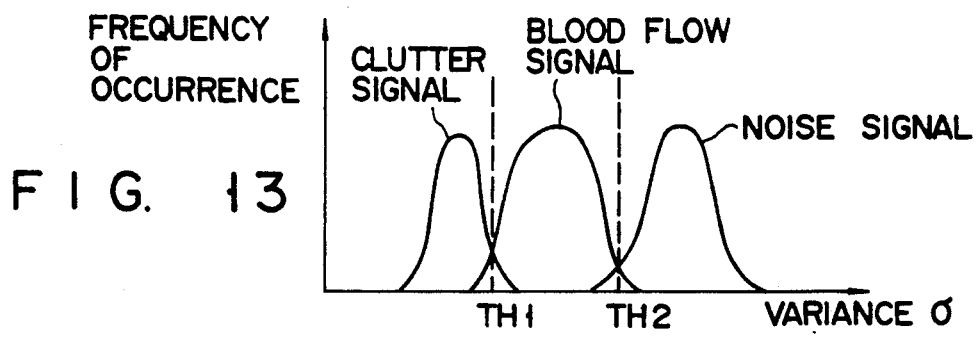
FIG. 13 is a graph showing a relationship between the distributions of blood flow signals, clutter signals, and noise signals, the average velocity v, and the frequency of occurrence of the average velocity v.
Figure 14:
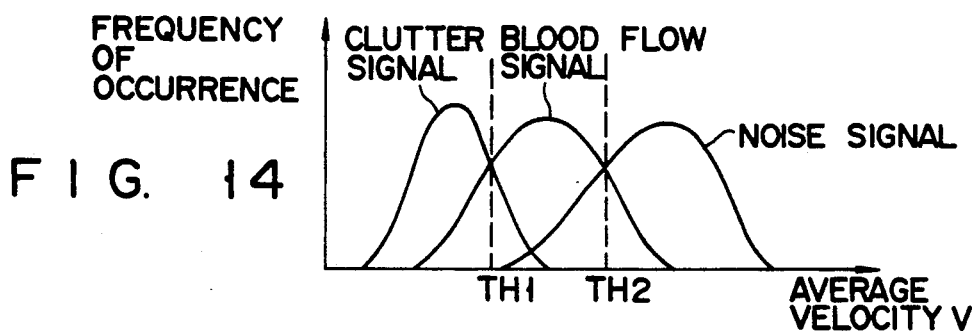
FIG. 14 is a graph showing a relationship between the distributions of blood flow signals, clutter signals, and noise signals, the power p, and the variance $\sigma$.
Figure 15:
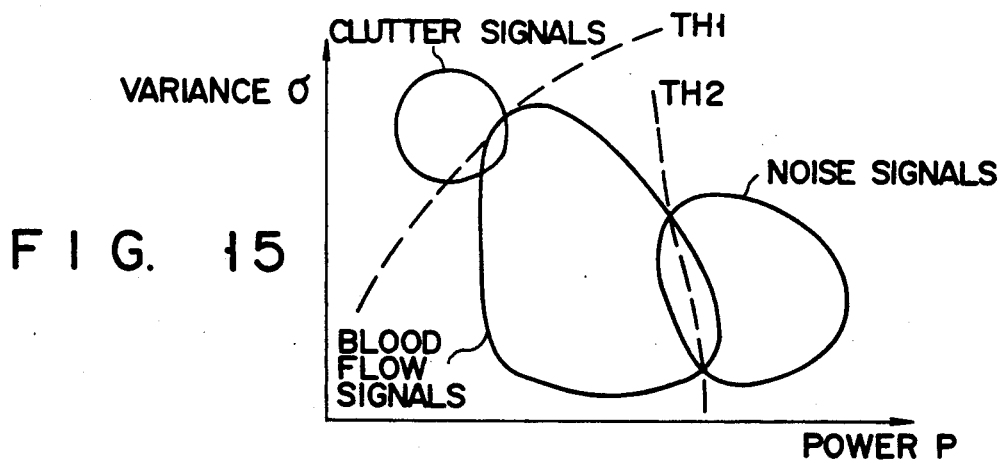
FIG. 15 is a graph showing a relationship between the distributions of blood flow signals, clutter signals, and noise signals, the average velocity p, and the power p.
Figure 16:
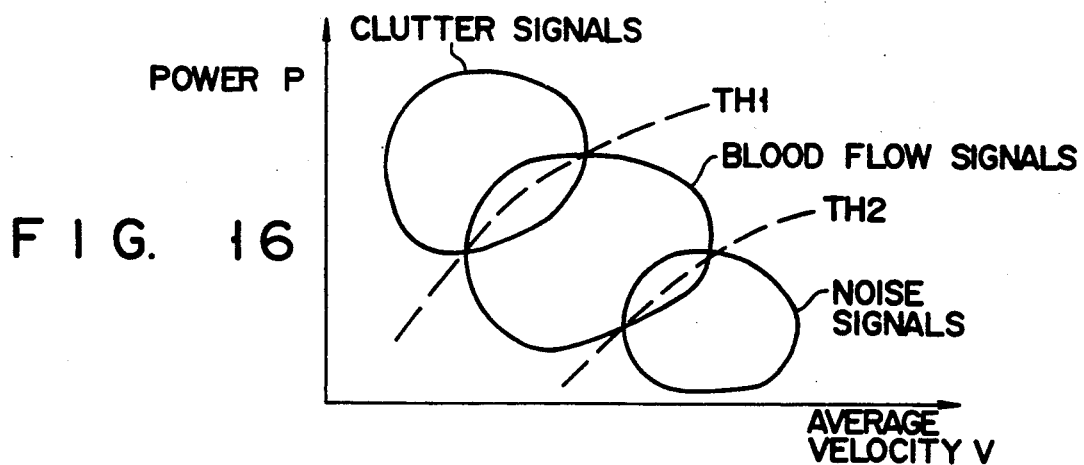
FIG. 16 is a graph showing a relationship between the distributions of blood flow signals, clutter signals, and noise signals, the average velocity v, the variance $\sigma$, and the power p.

In this case, $f_1$ and $f_2$ are functions of $V_i$, $T_i$, and $P_i$, and $TH_2$ and $TH_2$ are threshold values. The discrimination processing circuit 126 will be described in more detail below with reference to FIG. 12. FIG. 12 is a graph showing distributions associated with power and average velocity with a given variance $T_0$ in FIG. 15. In this case, blood signals, clutter signals, and noise signals are distributed as shown in FIG. 12. In the conventional apparatus, signals having values lower than the threshold value $T_0$ are subjected to blanking, as shown in FIG. 12. For this reason, some blood signals having small powers are subjected to blanking, although the clutter signals are displayed without being blanked. In the present invention, threshold functions shown in FIG. 12 are set to efficiently discriminate the respective signals.

In this case, in order to facilitate the understanding of the following description, $$f_1(V_i, T_i, P_i) = f_2(v_i, T_i, P_i) \text{ is set.}$$

In FIG. 12, $f_1 = 2$ corresponds to TH2, and $f_1 = 5$ corresponds to TH1. In order to efficiently discriminate blood flow signals, noise signals, and clutter signals, these functions and threshold values are set in accordance with a diagnosis target set through an apparatus panel, the type of an ultrasonic probe to be used, transmission/reception conditions, the degree or cutoff frequency of an MTI filter, the number of data, a gain, and the like. In addition, they may be changed in accordance with a change in distance (depth) from a body surface.

The determination result $Z_i$ is supplied to the second discrimination circuit 126B. The circuit 126B finally checks from a spatial distribution state whether the pixel $D_i$ is a blood flow signal, a noise signal, or a clutter signal. The final determination result $Z'_i$ is supplied to the discriminator 126D. If the value of $Z'_i$ is 1 or 2, i.e., a noise signal or a clutter signal, the discriminator 126D outputs "0" with respect to the pixel $D_i$, thus blanking it. If the value of $Z'_i$ is, however, 1, i.e., a clutter signal, the discriminator 126D may output a certain value to display the clutter signal differently from a blood signal, e.g., with different display brightness or color.

The second discrimination circuit 126C receives $2_{n+1}$ pixels ($Z_{i-n}$ to $Z_{i+n}$) from the first discrimination circuit 126B and performs the following discrimination processing.

If $Z_i = 2$ and the value of the pixel $Z_i = 3$ of the pixels $Z_{i=n}$ to $Z_{i+n}$ is TH3 or more, $Z'_i = 3$.

If $Z_i = 3$ and the value of the pixel $Z_i = 1$ of the pixels $Z_{i=n}$ to $Z_{i+n}$ is TH4 or more, $Z'_i = 1$.

If $Z_i = 3$ and the value of the pixel $Z_i = 3$ of the pixels $Z_{i=n}$ to $Z_{i+n}$ is TH5 or more, $Z'_i = 2$.

In this case, TH3, TH4, and TH5 are certain threshold values, and these determination logic expressions and threshold values are set on the basis of a diagnosis target set through the apparatus panel, the type of an ultrasonic probe to be used, transmission/reception conditions, the degree or cutoff frequency of an MTI filter, the number of data, a gain, and the like. In addition, they may be changed in accordance with a change in depth from a body surface. For example, the value of TH3 is increased with an increase in diameter of a blood vessel at a diagnosis portion, and vice versa.

An output from the discrimination processing circuit 126 is fetched in the color processing circuit 128 through the DSC 127. The color processing circuit 128 serves to convert average velocity, variance, and power signals into RGB signals. A processed output and a B mode image output from the color processing circuit 128 are supplied to the monitor 131 through the MPX 129 and the D/A converter 130.

As described above, in the apparatus of this embodiment, blood signals, noise signals, and clutter signals are discriminated from each other on the basis of their velocities, variances, and power and their spatial distributions. With this operation, blood signals to be displayed can be maximized in amount, whereas noise and clutter signals to be displayed can be minimized in amount, thus improving readability of blood flow information and the diagnostic performance.

With regard to especially spatial distributions, not only a distribution in the direction of depth but also a distribution across a plurality of scan lines may be used as distribution information.

In addition, discrimination of blood flows, noise, and clutter may be performed by using spatial distributions of velocities, variances, and power of the respective pixels to be operated. Furthermore, such discrimination processing may be performed after the MPX 129. A Fourier transformer may be used in place of the auto-correlation circuit 122.

FIGS. 13 to 16 are graphs, each showing a relationship between blood flow signals, clutter signals, noise signals, velocities, variances, and power. By using these characteristic relationships, discrimination of blood flow signals, clutter signals, and noise signals can be performed on the basis of a combination of velocities, variances, and power.

Moreover, since the above-described characteristics vary depending on a diagnosis target, blood flow signals, clutter signals, and noise signals can be discriminated from each other by utilizing these different characteristics in accordance with velocities, variances, and power. FIG. 17 shows a case of a heart. FIG. 18 shows a case of carotid arteries.

As has been described above, the present invention is associated with an ultrasonic blood flow imaging apparatus comprising an ultrasonic probe, a transmission system, a reception system, a B mode processing system, a CFM processing system, an FFT processing system, a video system, and a control system. The CFM processing system includes a new discriminating means. The discriminating means receives power, average blood flow velocity, and variance data output from an autocorrelation circuit. The discriminating means can discriminate Doppler shift signals (blood flow signals), noise signals, and clutter signals from each other with high precision on the basis of a relationship of a combination of two or more received factors, i.e., the power, average blood flow velocity, and variance data. With such discrimination processing, only necessary blood flow signals and hence high-precision blood flow information can be obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An ultrasonic blood flow imaging apparatus comprising:

first means for displaying a tomographic image of an object to be examined on the basis of reflected components of ultrasonic waves transmitted to the object; and second means having at least auto-correlation means and arithmetic means, for color-display processing blood flow Doppler signals for display as a two-dimensional blood flow image superimposed on the tomographic image, said auto-correlation means obtaining blood flow Doppler signals detected from the object using an auto-correlation method, and said arithmetic means obtaining said blood flow Doppler signals from said auto-correlation means, wherein said second means includes comparing means, provided between said auto-correlation means and said arithmetic means, for comparing a power information value of each blood flow Doppler signal obtained by said auto-correlation means and a predetermined value, discriminating means, provided between said auto-correlation means and said arithmetic means, for discriminating the blood flow Doppler signals into blood flow Doppler signals having power information values lower than a predetermined value and signals other than the blood flow Doppler signals based on the result of the comparison made by said comparing means, and display means for displaying the blood flow Doppler signals discriminated by said discriminating means as a two-dimensional blood flow image together with the tomographic image.

2. An apparatus according to claim 1, wherein said discriminating means discriminates and separates the blood flow Doppler signals into blood flow Dopper signals and other signals on the basis of a comparison between a power information value of each blood flow Doppler signal obtained from the object and a first predetermined value and a comparison between a velocity information value of each blood flow Doppler signal with a second predetermined value.

3. An apparatus according to claim 1, further comprising means for changing the predetermined value in accordance with a diagnosis target of the object.

4. An apparatus according to claim 1, further comprising means for changing the predetermined value in accordance with a distance from a body surface of the object.

5. An apparatus according to claim 1, wherein said display means includes means which does not display signals other than the blood flow Doppler signals, which are discriminated by said discriminated means, as a two-dimensional blood flow image.

6. An apparatus according to claim 1, wherein said display means includes means for displaying signals other than the blood flow Doppler signals, which are discriminated by said discriminating means, as a two-dimensional image by a display scheme different from a display scheme for the discriminated blood flow Doppler signals.

7. An ultrasonic blood flow imaging apparatus comprising:
first means for displaying a tomographic image of an object to be examined on the basis of reflected components of ultrasonic waves transmitted to the object; and
second means having at least auto-correlation means and arithmetic means, for color-display processing blood flow Doppler signals for display as a two-dimensional blood flow image superimposed on the tomographic image, said auto-correlation means obtaining blood flow Doppler signals detected from the object using an auto-correlation method, and said arithmetic means obtaining said blood flow Doppler signals from said auto-correlation means,
wherein said second means includes
comparing means, provided between said auto-correlation means and said arithmetic means, for comparing a power information value of each blood flow Doppler signal obtained by said auto-correlation means and a predetermined value,
discriminating means, provided between said auto-correlation means and said arithmetic means, for discriminating the blood flow Doppler signals into blood flow Doppler signals and other signals based on the result of the comparison made by said comparing means, and
display means for displaying the blood flow Doppler signals discriminated by said discriminating means as a two-dimensional blood flow image together with the tomographic image.

8. An apparatus according to claim 7, wherein said discriminating means discriminates and separates the blood flow Doppler signals into blood flow Doppler signals and other signals on the basis of a comparison between a variance information value of each blood flow Doppler signal obtained from the object and a first predetermined value and comparison between a velocity information value of each blood flow Doppler signal with a second predetermined value.

9. An apparatus according to claim 7, further comprising means for changing the predetermined value in accordance with a diagnosis target of the object.

10. An apparatus according to claim 7, further comprising means for changing the predetermined value in accordance with a distance from a body surface of the object.

11. An apparatus according to claim 7, wherein said display means includes means for inhibiting the display of the signals other than the blood flow Doppler signals, which are discriminated by said discriminated means, as a two-dimensional blood flow image.

12. An apparatus according to claim 7, wherein said display means includes means for displaying signals other than the blood flow Doppler signals, which are discriminated by said discriminating means, as a two-dimensional image by a display scheme different from a display scheme for the discriminated blood flow Doppler signals.

13. An ultrasonic blood flow imaging apparatus comprising:
first means for displaying a tomographic image of an object to be examined on the basis of reflected components of ultrasonic waves transmitted to the object; and
second means having at least auto-correlation means and arithmetic means, for color-display processing blood flow Doppler signals for display as a two-dimensional blood flow image superimposed on the tomographic image, said auto-correlation means obtaining blood flow Doppler signals detected from the object using an auto-correlation method, and said arithmetic means obtaining said blood flow Doppler signals from said auto-correlation means,
wherein said second means includes
first comparing means, provided between said auto-correlation means and said arithmetic means, for comparing a power information value of each blood flow Doppler signal obtained by said auto-correlation means and a predetermined value,
second comparing means, provided between said auto-correlation means and said arithmetic means, for comparing a variance information value of each blood flow Doppler signal obtained by said auto-correlation means and a second predetermined value,
discriminating means, provided between said auto-correlation means and said arithmetic means, for discriminating the blood flow Doppler signals into blood flow Doppler signals having power information values lower than a predetermined value and signals other than the blood flow Doppler signals based on the result of the comparison made by said first comparing means and said second comparing means, and
display means for displaying the blood flow Doppler signals discriminated by said discriminating means as a two-dimensional blood flow image together with the tomographic image.

14. An apparatus according to claim 13, wherein said discriminating means discriminates and separates the blood flow Doppler signals into blood flow Doppler signals and other signals on the basis of a comparison between a power information value of each blood flow Doppler signal obtained form the object and a first predetermined value, a comparison between a variance information value of each blood flow Doppler signal and a second predetermined value, and a comparison between a velocity information value of each blood flow Doppler signal with a third predetermined value.

15. An apparatus according to claim 13, further comprising means for changing the first and second predetermined values in accordance with a diagnosis target of the object.

16. An apparatus according to claim 13, further comprising means for changing the first and second predetermined values in accordance with a distance from a body surface of the object.

17. An apparatus according to claim 13, wherein said display means includes means for inhibiting the display of the signals other than the blood flow Doppler signals, which are discriminated by said discriminated means, as a two-dimensional blood flow image.

18. An apparatus according to claim 13, wherein said display means includes means for displaying signals other than the blood flow Doppler signals, which are discriminated by said discriminating means, as a two-dimensional image by a display scheme different from a display scheme for the discriminated blood flow Doppler signals.

* * * * *

UNITED STATES PATENT AND TRADEMARK OFFICE
CERTIFICATE OF CORRECTION

PATENT NO. : 5,190,044
DATED : March 02, 1993
INVENTOR(S) : Schuichi Kawasaki et al.

It is certified that error appears in the above-identified patent and that said Letters Patent is hereby corrected as shown below:

On the title page, Item [75] Inventor: change "Toshio Shiraska" to --Toshio Shirasaka--.

Claim 2, column 12, line 46, change "Dopper" to --Doppler--.

Claim 13, column 14, line 18, after "a", insert --first--.

Signed and Sealed this

Twenty-fifth Day of January, 1994

Attest:

*Attesting Officer*

BRUCE LEHMAN

*Commissioner of Patents and Trademarks*